United States Patent
Dufils et al.

(10) Patent No.: US 10,982,110 B2
(45) Date of Patent: Apr. 20, 2021

(54) PROCESS FOR THE PREPARATION OF A VINYLIDENE CHLORIDE POLYMER/CLAY COMPOSITE, FILMS OBTAINED THEREFROM, AND USE THEREOF

(71) Applicants: SOLVAY SA, Brussels (BE); CENTRE NATIONAL DE LA RECHERCHE SCIENTIFIQUE, Paris (FR); Université Claude Bernard Lyon 1, Villeurbanne (FR); Ecole Superieure de Chimie Physique Electronique de Lyon, Villeurbanne (FR); Ezus Lyon, Villeurbanne (FR)

(72) Inventors: Pierre-Emmanuel Dufils, Paris (FR); Isabelle Chaduc, Tavaux (FR); Laura Delafresnaye, Lyons (FR); Elodie Bourgeat-Lami, Nievroz (FR); Muriel Lansalot, Genas (FR); Jérôme Vinas, Brussels (BE); Yves Vanderveken, Heverlee (BE)

(73) Assignees: Solvay SA, Brussels (BE); Centre National de la Recherche Scientifique, Paris (FR); Université Claude Bernard Lyon 1, Villeurbanne (FR); Ecole Supérieure de Chimie Physique Electronique de Lyon, Villeurbanne (FR); Ezus Lyon, Villeurbanne (FR)

(*) Notice: Subject to any disclaimer, the term of this patent is extended or adjusted under 35 U.S.C. 154(b) by 73 days.

(21) Appl. No.: 15/778,891
(22) PCT Filed: Nov. 25, 2016
(86) PCT No.: PCT/EP2016/078853
§ 371 (c)(1),
(2) Date: May 24, 2018
(87) PCT Pub. No.: WO2017/089566
PCT Pub. Date: Jun. 1, 2017

(65) Prior Publication Data
US 2018/0346750 A1 Dec. 6, 2018

(30) Foreign Application Priority Data

Nov. 27, 2015 (EP) .................................... 15306883

(51) Int. Cl.
*C08L 27/08* (2006.01)
*C09D 127/08* (2006.01)
(Continued)

(52) U.S. Cl.
CPC .............. *C09D 127/08* (2013.01); *C08F 2/44* (2013.01); *C08F 292/00* (2013.01); *C08K 3/346* (2013.01);
(Continued)

(58) Field of Classification Search
CPC .......... C09D 127/08; C09D 7/70; C09D 7/45; C09D 151/10; C09D 7/61; C08F 2/44;
(Continued)

(56) References Cited

U.S. PATENT DOCUMENTS 2,538,050 A 1/1951 Schick
2,538,051 A 1/1951 Schick
(Continued)

FOREIGN PATENT DOCUMENTS

GB 653359 A 5/1951
GB 692432 A 6/1953
(Continued)

OTHER PUBLICATIONS

Wilkie et al., Ed., "Structure and Properties of Clays", Fire Retardancy of Polymeric Materials, 2nd Ed., Section 11.2.1, pp. 263-265, Taylor & Francis [retrieved Jan. 31, 2020]. Retrieved from Knovel. (Year: 2010).*

(Continued)

*Primary Examiner* — Josephine L Chang
(74) *Attorney, Agent, or Firm* — Osha Bergman Watanabe & Burton LLP (57) ABSTRACT

The present invention relates to a process for preparing a vinylidene chloride polymer composite comprising a
(Continued)

$D_Z$ and surface coverage of the particles by Laponite vinylidene chloride polymer and clay materials. The process comprises polymerising vinylidene chloride and clay materials and the resulting vinylidene chloride polymer particle is surrounded by a plurality of clay platelets. The clay materials according to the present invention function as a solid stabilizer in the process for preparing a vinylidene chloride polymer composite of the present invention. The present invention further relates to the vinylidene chloride polymer composite obtainable from the process, to use of the vinylidene chloride polymer composite for the preparation of films, and to films prepared therefrom.

7 Claims, 2 Drawing Sheets (51) Int. Cl.
C09D 151/10 (2006.01)
C08K 3/34 (2006.01)
C09D 7/45 (2018.01)
C09D 7/40 (2018.01)
C08F 292/00 (2006.01)
C08F 2/44 (2006.01)
C09D 7/61 (2018.01)
C08F 214/08 (2006.01)
C08F 220/18 (2006.01)

(52) U.S. Cl.
CPC ............... *C08L 27/08* (2013.01); *C09D 7/45* (2018.01); *C09D 7/61* (2018.01); *C09D 7/70* (2018.01); *C09D 151/10* (2013.01); *C08F 214/08* (2013.01); *C08F 220/18* (2013.01); *C08L 2203/16* (2013.01)

(58) Field of Classification Search
CPC .... C08F 292/00; C08F 214/08; C08F 220/18; C08K 3/346; C08L 27/08; C08L 2203/16

USPC ........................................................ 524/445
See application file for complete search history.

(56) References Cited

U.S. PATENT DOCUMENTS

| | | |
|---|---|---|
| 2,875,185 A | 2/1959 | Wiley |
| 2,886,559 A | 5/1959 | Wiley |
| 9,850,364 B2 | 12/2017 | Vinas et al. |
| 2006/0122308 A1 | 6/2006 | Wermter et al. |
| 2006/0235127 A1 | 10/2006 | Moad et al. |
| 2008/0287587 A1 | 11/2008 | Lin et al. |
| 2014/0357791 A1 | 12/2014 | Vinas et al. |

FOREIGN PATENT DOCUMENTS

| | | |
|---|---|---|
| RU | 230631 C2 | 3/2009 |
| RU | 2350632 C2 | 3/2009 |
| TW | 200844148 A | 11/2008 |
| WO | 2005044938 A2 | 5/2005 |
| WO | 2009130302 A1 | 10/2009 |
| WO | 2013092590 A1 | 6/2013 |

OTHER PUBLICATIONS

Jiang et al., "Preparation and Characterization of Vinylidene Chloride Copolymer/Layered Double Hydroxide Nanocomposites," Acta Polymerica Sinica, No. 9, Sep. 2013, English translation. (Year: 2013).*

Vinas J. et al., "Poly(vinylidene chloride)", Ullmann's Encyclopedia of Industrial Chemistry, 2012, p. 1-16—Wiley VCH-Verlag.

Jiang F. Y. et al., "Preparation and characterization of vinylidene chloride copolymer/layered double hydroxides nanocomposites", Acta Polymerica Sinica. No. 9, 2013, p. 1131-1136. Plus English Language Abstract.

* cited by examiner

Figure 1 : $D_Z$ and surface coverage of the particles by Laponite

Figure 2 : $N_p$ for P(VDC-co-MA)/Laponite S482 composites with varying Laponite contents

Figure 3 : Evolution of $D_Z$ over time (for 12 months)

PROCESS FOR THE PREPARATION OF A VINYLIDENE CHLORIDE POLYMER/CLAY COMPOSITE, FILMS OBTAINED THEREFROM, AND USE THEREOF

CROSS-REFERENCE TO RELATED APPLICATION

This application is a U.S. national stage entry under 35 U.S.C. § 371 of International Application No. PCT/EP2016/078853 filed Nov. 25, 2016, which claims priority to European application No. EP 15306883.8 filed Nov. 27, 2015. The entire contents of these applications are explicitly incorporated herein by this reference.

TECHNICAL FIELD

The present invention relates to a process for preparing a vinylidene chloride polymer composite comprising a vinylidene chloride polymer and clay materials. The process comprises polymerising vinylidene chloride and clay materials and the resulting vinylidene chloride polymer particle is surrounded by a plurality of clay materials. The clay materials according to the present invention function as a solid stabilizer in the process for preparing a vinylidene chloride polymer composite of the present invention. The present invention further relates to the vinylidene chloride polymer composite obtainable from the process, to use of the vinylidene chloride polymer composite for the preparation of films, and to films prepared therefrom.

BACKGROUND OF THE INVENTION

The following discussion of the prior art is provided to place the invention in an appropriate technical context and enable the advantages of it to be more fully understood. It should be appreciated, however, that any discussion of the prior art throughout the specification should not be considered as an express or implied admission that such prior art is widely known or forms part of common general knowledge in the field.

Polyvinylidene chloride is a well-known polymer for its very good barrier properties against water vapor and gases, notably oxygen, which are required, for instance, in the packaging and storage applications, notably for the pharmaceutical and food fields, and thus extends the shelf life of contents inside the packaging.

Very low permeability of polyvinylidene chloride comes from its crystallinity and its two chloride atoms per monomer. The higher the amount of vinylidene chloride is, the better the barrier properties are. However, polyvinylidene chloride has inherent brittle feature and is hardly processible, and vinylidene chloride is thus usually copolymerised with monomers, for instance with at least one ethylenically unsaturated monomers including methyl acrylate, for the purpose of better processibility and improved solubility in most solvents commonly used in this field.

In view of barrier properties, using fillers with a high aspect ratio permits to considerably decrease permeability, because fillers, in particular those organized in a specific orientation, behave as a physical obstacle and gas molecules have to bypass them to go through the material. Low permeability has been obtained with materials containing various types of platelets such as graphite oxide, or layered-silicate, e.g., Montmorillonite or Kaolinite. Fillers having affinity to gas are preferred. In this context, the incorporation of clay into the vinylidene chloride polymer has been studied. In addition, there have been many attempts for surfactant-free polymerisation using Laponite as a solid stabilizer. Such trials of stabilizing oil-in-water or water-in-oil emulsions by colloidal particles (so-called Pickering emulsions) were earlier known to the public, since using a surfactant has a drawback in view of barrier properties, that is, a surfactant provides preferential tunnels for gas molecules and hence negatively affects the barrier properties. This strategy was extrapolated to the synthesis of armored particles through conventional emulsion polymerization using clay platelets as a solid stabilizer, which is advantageous in that there is no need for high-shear mixing as is usually the case in the polymerization of Pickering emulsions and a surfactant is not required in the process.

While extremely useful in a food packaging thanks to its excellent barrier properties, there exists a drawback in using polyvinylidene chloride, i.e., the polyvinylidene chloride may undergo thermally induced dehydrochlorination at temperatures very near to its processing temperatures, which easily propagates and leaves polyene sequences long enough to absorb visible light and thus change its color from colorless to an undesirable color, e.g., light brown/yellow. That is, a whitening effect is observed, which is not acceptable, notably in food packaging.

For particular applications, such as packaging and storage applications, notably for the pharmaceutical and food fields, required is a vinylidene chloride polymer composite which is capable of exhibiting excellent barrier properties, in particular oxygen permeability and water vapor permeability. It is also required, that after coating and drying the vinylidene chloride polymer composite, the thusly obtained film does not undergo whitening effect after sterilization (0.5 hour at 121° C.) or pasteurization (2 hours at 95° C.), in particular in food packaging applications.

Vinylidene chloride polymers are typically prepared by a radical polymerisation process; see for instance Ullmann's Encyclopedia of Industrial Chemistry. Poly(vinylidene chloride). Edited by WILEY. Weinheim: Wiley VCH-Verlag, 2012. Few studies regarding the preparation of vinylidene chloride polymer composites have been reported, of which the purpose is to improve its barrier properties. For instance, WO 13/092590 A1 (Solvay S A), published on Jun. 27, 2013, discloses a process for preparing vinylidene chloride polymer composite comprising a clay material, which comprises polymerising vinylidene chloride at the surface of a clay material under the control of a reversible addition fragmentation chain transfer (RAFT) and/or macromolecular design via inter-exchange of xanthate (MADIX) agent so that vinylidene chloride polymer chains have grown around the clay material.

However, to the best of our knowledge, the synthesis of vinylidene chloride polymer composite comprising a clay material as a solid stabilizer by in situ surfactant-free aqueous emulsion polymerisation has never been implemented.

DESCRIPTION OF THE INVENTION

Thus, the purpose of the present invention is to provide a process for preparing vinylidene chloride polymer composites by in situ which can be advantageously performed as surfactant-free aqueous emulsion polymerisation, which can provide excellent colloidal stability in a specific amount range of a clay material, and also transparency of thusly obtained films, i.e., no whitening effect as well as excellent barrier properties.

The present invention therefore relates to a process for preparing a vinylidene chloride polymer composite comprising:
i) providing a dispersion of a clay material and a free radical initiator in a liquid phase;
ii) adding vinylidene chloride and at least one ethylenically unsaturated monomer copolymerisable therewith to said dispersion; and
iii) polymerising vinylidene chloride and said at least one ethylenically unsaturated monomer to form vinylidene chloride polymer composite,
wherein the amount of a clay material ranges from 10.0 to 60.0 g per liter ("g $L^{-1}$") with respect to the liquid phase, preferably 25.0 to 40.0 g $L^{-1}$ with respect to the liquid phase, and the copolymer has a % by weight (wt %) of vinylidene chloride/said ethylenically unsaturated monomer from 82/18 to 93/7, preferably from 85/15 to 90/10.

Indeed, it has been surprisingly found by the present inventors that the vinylidene chloride polymer composite of the present invention consists of a vinylidene chloride polymer particle core surrounded by a plurality of clay materials, which eventually enhances colloidal stability of such clay-armored vinylidene chloride polymer composite and also contributes to the barrier properties against water vapor and gas, notably oxygen. It has also been found that the clay materials function as solid stabilizers in the polymerisation process of the present invention. It has moreover been found that the film prepared from the vinylidene chloride polymer composite of the present invention does not undergo whitening effect after sterilization (0.5 hour at 121° C.) or pasteurization (2 hours at 95° C.).

In addition, according to certain embodiments of the present invention, it has been surprisingly found by the present inventors that using clay material in an amount of 10.0 to 60.0 g $L^{-1}$ with respect to the liquid phase, preferably 25.0 to 40.0 g $L^{-1}$ with respect to the liquid phase makes it possible to obtain a stable vinylidene chloride polymer composite.

Other characteristics, details and advantages of the present invention will emerge more fully upon reading the description which follows.

Throughout the description, including the claims, the term "comprising one" should be understood as being synonymous with the term "comprising at least one", unless otherwise specified, and the term "between" should be understood as being inclusive of the limits.

The expression "vinylidene chloride polymer composite" is used in the present application to denote a polymer composite comprising a vinylidene chloride polymer particle surrounded by a plurality of clay materials. With the phrase "vinylidene chloride polymer particle surrounded by clay materials," it is meant herein that the clay materials entirely surround, homogeneously or inhomogeneously, the vinylidene chloride polymer particle or that the clay materials surround only partially the vinylidene chloride polymer particle.

The clay materials may consist of one or several individual solid particles aggregated together, which at least partially surround a vinylidene chloride polymer particle forming basically the core of the vinylidene chloride polymer composite. The thickness of the clay materials surrounding the vinylidene chloride polymer particle may be relatively constant. However, the thickness of the polymer composite may also vary depending on the clay materials and/or the distribution of clay materials on the vinylidene chloride polymer particle. The uniformity and continuity of the clay materials surrounding the vinylidene chloride polymer particle can be visually determined, for example, by Transmission Electron Microscopy (TEM), cryo-TEM, and Scanning Transmission Electron Microscopy (STEM)-High-Angle Annular Dark Field (HAADF).

The cross section of the film according to the present invention, which can be prepared from the vinylidene chloride polymer composite of the present invention, exhibits honey-comb structure being observed by TEM.

There is no particular limit as to the thickness of clay materials which surround vinylidene chloride polymer particle, with the ultimate thickness being generally decided by the intended application of the composite. The thickness of the clay materials, which encapsulate the vinylidene chloride polymer particle, is preferably not greater than 10 nm, more preferably not greater than 5 nm, still more preferably not greater than 2 nm, and most preferably not greater than 1 nm.

The clay material can be of any type, shape or size provided that it can be dispersed in the liquid phase.

The expression "clays" is hereby used according to its usual meaning, including naturally occurring phyllosilicates, synthetic clays, and chemically modified clays. In general, clays are aluminosilicates characterized by sheet-like layered structures and consist of tetrahedral silica $SiO_4$ units bonded to octahedral alumina $AlO_6$ units in various manners. Other metals such as magnesium (Mg), iron (Fe) or zinc (Zn) may replace aluminum in the crystal structure. Depending on the composition of the clay, the sheets or layers may carry a charge on the surface and on the edges. That is, for instance, Si in the tetrahedral sheets may be replaced with trivalent Al, whereas in the octahedral sheets, trivalent Al may be replaced with divalent Mg, Fe or Zn. This replacement is usually referred to as isomorphic substitution, i.e., an atom of higher valency is replaced by one of lower valency. This results in a deficit of positive charges or excess of negative charges. These negative charges are balanced by counter-ions, e.g., $Na^+$ or $Ca^{2+}$, which may be located in the inter-layer spacing of the clays. The thickness of the layers or sheets may be in the order of 1 nm and the aspect ratio may range from 25 to 1500. Synthetic clays or chemically modified clays are also available. Naturally occurring, synthetic, or modified clays can be used in the process of the present invention.

Among natural clays, mention can be made of smectite clays, for example, Bentonite clays, e.g., Montmorillonite, Hectorite, Laponite, Saponite, mica, Vermiculite, Nontronite, Beidellite, Volkonskoite, Kaolinite, and Serpentinite.

Among synthetic clays, mention may be made of synthetic silicates, synthetic mica, synthetic Saponite, and synthetic Hectorite.

Among modified clays, mention may be made of Gibbsite, fluorinated Montmorillonite, and fluorinated mica.

Typically, the average particle diameter ($D_Z$) of the clay material, as measured by dynamic light scattering ("DLS") at 25° C., for instance, using the method as described in ISO 22412:2008(E) and the Zetasizer Nano S90 from Malvern Instruments, is advantageously of at least 1 nm, preferably at least 10 nm, more preferably at least 20 nm. The average particle size of the clay material is preferably not greater than 1000 nm, typically not greater than 100 nm, and more preferably not greater than 50 nm. Good results have been obtained when the average particle size of the clay material is from 1 to 300 nm, preferably from 10 to 100 nm, and more preferably from 20 to 50 nm. An average particle size of the clay material in the range of from 25 to 35 nm has also been found suitable to provide vinylidene chloride polymer composites with advantageous properties.

Vinylidene chloride polymers of the present invention are copolymers of vinylidene chloride and at least one ethylenically unsaturated monomer, in particular copolymers having a wt % of vinylidene chloride/at least one ethylenically unsaturated monomer from 82/18 to 93/7, preferably from 85/15 to 90/10.

The homopolymer, i.e., vinylidene chloride polymer, is hardly processable and only copolymers are commercially important, emulsion and suspension polymerisation being the preferred industrial manufacturing processes. Vinylidene chloride is thus to be copolymerised with monomers, for instance with ethylenically unsaturated monomers including methyl acrylate, for the purpose of having better processibility and fine-tuning the performances of target. In particular, adding a hydrophilic monomer in the system contributes to the adhesion of clay materials to the surface of the vinylidene chloride polymer particle. The term "hydrophilic" is used throughout the present specification with its commonly recognized meaning, that is, to refer to compounds and/or functional parts of compounds 'provided with a tendency to bind or absorb water.'

Non-limiting examples of at least one ethylenically unsaturated monomers copolymerisable with vinylidene chloride that can be used in the process of the present invention, include, for instance, vinyl chloride, vinyl esters, such as vinyl acetate, vinyl ethers, acrylic acids, their esters and amides, methacrylic acids, their esters and amides, acrylonitrile, methacrylonitrile, styrene, styrene derivatives, such as styrene sulfonic acid and its salts, vinyl phosphonic acid and its salts, butadiene, olefins, such as ethylene and propylene, itaconic acid, and maleic anhydride.

Preferably, at least one ethylenically unsaturated monomer copolymerisable with vinylidene chloride used in the process of the invention is selected from the group consisting of vinyl chloride, maleic anhydride, itaconic acid, styrene, styrene derivatives, and the acrylic or methacrylic monomers corresponding to general formula (I):

$$CH_2=CR_1R_2 \qquad (I)$$

wherein $R_1$ is chosen from hydrogen and —$CH_3$ and $R_2$ is chosen from —CN and —$COR_3$, wherein $R_3$ is chosen from —OH and —$OR_4$, wherein $R_4$ is a $C_1$-$C_{18}$ linear or branched alkyl group optionally bearing one or more —OH groups, a $C_2$-$C_{10}$ epoxy alkyl group and a $C_2$-$C_{10}$ alkoxy alkyl group, and wherein $R_3$ is also chosen from the —$NR_5R_6$ radicals, in which $R_5$ and $R_6$, same or different, are chosen from hydrogen and $C_1$-$C_{10}$ alkyl groups, optionally bearing one or more —OH groups.

More preferably, at least one ethylenically unsaturated monomer copolymerisable with vinylidene chloride used in the process of the present invention is selected from the group consisting of vinyl chloride, maleic anhydride, itaconic acid, the acrylic or methacrylic monomers selected from the group consisting of methyl acrylate, methyl methacrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl acrylate, glycidyl methacrylate, acrylonitrile, methacrylonitrile, acrylic acid, methacrylic acid, acrylamide, N-methylolacrylamide, and N,N-di(alkyl)acrylamide.

Even more preferably, at least one ethylenically unsaturated monomer copolymerisable with vinylidene chloride is selected from the group consisting of maleic anhydride, itaconic acid, the acrylic or methacrylic monomers selected from the group consisting of methyl acrylate, methyl methacrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl acrylate, glycidyl methacrylate, acrylonitrile, methacrylonitrile, acrylic acid, methacrylic acid, acrylamide, N-methylolacrylamide, and N,N-di(alkyl)acrylamide.

Most preferably, at least one ethylenically unsaturated monomer copolymerisable with vinylidene chloride is selected from the group consisting of methyl acrylate, methyl methacrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl acrylate, glycidyl methacrylate, acrylonitrile, methacrylonitrile, acrylic acid, methacrylic acid, acrylamide, N-methylolacrylamide, and N,N-di(alkyl)acrylamide.

The process of the present invention may be carried out in a liquid phase essentially consisting of vinylidene chloride and at least one ethylenically unsaturated monomer copolymerisable with vinylidene chloride.

In practical terms, the liquid phase functions as a reaction medium, in which vinylidene chloride and at least one ethylenically unsaturated monomer are polymerised to form a vinylidene chloride polymer, of which the surface is to be surrounded by a plurality of clay materials to form a vinylidene chloride polymer composite of the present invention. The monomer(s) may be present in the liquid phase as a separate liquid phase or it may be fully soluble in the liquid phase, or the liquid phase may itself consist essentially of the monomer(s).

Alternatively, the process may be carried out in the presence of a liquid phase different from vinylidene chloride and at least one ethylenically unsaturated monomer. The liquid phase may be either formed of an organic solvent or it may be water.

In a preferred embodiment of the process of the invention, the liquid phase is water and the process produces an aqueous dispersion of vinylidene chloride polymer composite.

When the liquid phase is water, the process may be an emulsion radical polymerisation process, i.e., a radical polymerisation process which is carried out in an aqueous medium in the presence of radical initiators which are preferably soluble in water.

Where the process of the invention is performed using a continuous liquid phase which does not consist essentially of vinylidene chloride and at least one ethylenically unsaturated monomer, it is preferred that the monomers are introduced into the liquid phase after a stable dispersion of the clay material and a free radical initiator is prepared.

According to the process of the invention, vinylidene chloride and at least one ethylenically unsaturated monomer are polymerised to form a vinylidene chloride polymer particle surrounded by a plurality of clay materials.

The polymerisation will require initiation from a source of free radicals. The source of initiating radicals can be provided by any suitable method of generating free radicals, such as the thermally induced homolytic scission of suitable compound(s) (thermal initiators such as hydroperoxides, peroxides, peroxyesters, or azo compounds), redox initiating systems, photochemical initiating systems or high energy radiation such as electron beam, X-radiation, or gamma-radiation. In one or more embodiments, the free radical initiator is an inorganic initiator.

Advantageously, it might be possible to carry out an emulsion polymerisation process of vinylidene chloride without the addition of any surfactant, since the clay materials according to the present invention function as a solid stabilizer in the process for preparing a vinylidene chloride polymer composite of the present invention. That is, the resulting polymer composite exhibits enhanced colloidal stability.

Other conventional additives may be added to the liquid phase during the polymerisation process, such as dispersants, oxidants, and pH regulators as conventionally known in the art. However, no surfactant is required.

The process of the invention may be operated in batch, semi-continuous or continuous modes. Where the liquid phase consists essentially of vinylidene chloride and at least one ethylenically unsaturated monomer that are polymerised to form the polymer, the process is preferably operated in batch mode, and where the liquid phase does not consist essentially of vinylidene chloride and at least one ethylenically unsaturated monomer that are polymerised to form the polymer, the process is preferably operated in a continuous mode.

At the end of the process, the vinylidene chloride polymer composite may be either isolated as a solid from the liquid phase or may be used as an aqueous dispersion, for instance, when the liquid phase is water.

Conventional techniques can be used for the isolation of the vinylidene chloride polymer composite from the liquid phase.

The definitions and preferences defined previously within the context of the process for preparing a vinylidene chloride polymer composite according to the present invention also apply to the vinylidene chloride polymer composite, with particular reference to the composition of the vinylidene chloride polymer, and the nature and the particle size of the clay material.

In a first embodiment, the vinylidene chloride polymer composite comprises a clay material and a vinylidene chloride polymer comprising at least 50 wt % of recurring units derived from vinylidene chloride and at most 50 wt % of recurring units derived from at least one ethylenically unsaturated monomer selected from the group consisting of methyl acrylate, methyl methacrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl acrylate, glycidyl methacrylate, acrylonitrile, methacrylonitrile, acrylic acid, methacrylic acid, acrylamide, N-methylolacrylamide, and N,N-di(alkyl)acrylamide.

The clay material may be advantageously Laponite.

The clay particle may have an average particle diameter ($D_Z$) of from 1 to 300 nm, preferably from 10 to 270 nm. In a particularly preferred embodiment of the present invention, $D_Z$ of the clay material is in the range of from 50 to 250 nm, which has been found suitable to provide a polymer composite having advantageous properties in view of colloidal stability and whitening effect as well as excellent barrier properties against water vapor and gases, notably oxygen. The pH of the final latexes according to the present invention remains in the range of between 6.0 and 9.0 at least for 6 months.

In one embodiment of the process of the present invention, the amount of the clay material in the vinylidene chloride polymer composite is of at least 0.2 g $L^{-1}$ with respect to the liquid phase, even at least 0.4 g $L^{-1}$ with respect to the liquid phase. In a preferred embodiment of the process of the present invention, the amount of the clay material generally does not exceed 60.0 g $L^{-1}$ with respect to the liquid phase. In a particularly preferred embodiment of the process of the present invention, vinylidene chloride polymer composites comprising from 10.0 to 60.0 g $L^{-1}$, and even from 25.0 to 40.0 g $L^{-1}$ of the clay material with respect to the liquid phase have been found to be suitable for most applications. Increasing the amount of the clay material lowers the particle diameter of the resulting polymer composite, whereas the number of particles increases so that the surface area increases and more particles become stabilized. In fact, the clay materials either surround the surface of the polymer particle or are free in the latex. However, if the amount of the clay material exceeds 60 g $L^{-1}$ or more with respect to the liquid phase, an excess of the clay material may cause a gel effect in the latex subsequently as a consequence of a so-called "house-of-card" structure, which refers to an edge-to-face association of clay sheets due to the changes in electric charges on the surfaces and on the edges of clay sheets.

In one aspect, the composition comprising the vinylidene chloride polymer composite according to the present invention may be a solid composition, typically comprising the vinylidene chloride polymer composite and at least one polymer. The polymer used in the composition will be typically, but not limiting, selected among those polymers which are compatible with vinylidene chloride polymers. For instance, the other polymer may be a vinylidene chloride polymer, whose composition may be the same or different from the composition of the vinylidene chloride polymer in the vinylidene chloride polymer composite.

In another aspect, the composition may be a liquid composition comprising the vinylidene chloride polymer composite and a liquid phase.

In another aspect, the composition may be a liquid composition comprising the vinylidene chloride polymer composite, at least one polymer, and a liquid phase. The polymer used in the composition will be typically, but not limiting, selected among those polymers which are compatible with vinylidene chloride polymers. For instance, the other polymer may be a vinylidene chloride polymer, whose composition may be the same or different from the composition of the vinylidene chloride polymer in the vinylidene chloride polymer composite.

The liquid phase may be the same or different from the liquid phase used in the process for preparing the vinylidene chloride polymer composite. In a particularly advantageous aspect of the process of the invention, when the liquid phase does not consist essentially of vinylidene chloride and at least one ethylenically unsaturated monomer, the process may be conveniently used to directly prepare a dispersion of the vinylidene chloride polymer composite in a liquid which is ready for use. Alternatively, the liquid composition may be prepared by dispersing the vinylidene chloride polymer composite in a liquid.

The process of the invention makes it possible to obtain vinylidene chloride polymer composites which may give rise to the formation of high-quality films, which do not undergo whitening, notably even after sterilization (0.5 hour at 121° C.) or pasteurization (2 hours at 95° C.) while maintaining excellent barrier properties, in particular oxygen permeability and water vapour permeability.

Accordingly, further aspect of the present invention relates to a use of the vinylidene chloride polymer composites of the present invention for the preparation of films or coatings, as well as the films comprising a vinylidene chloride polymer composite as above defined. In particular, such films without 'whitening' effect after sterilization or pasteurization treatment are indeed required in the packaging and storage applications, notably for the food fields.

In one embodiment, the films may be prepared by conventional coating techniques either from a molten composition comprising the vinylidene chloride polymer composite or from a dispersion (either in water or in an appropriate solvent) of the vinylidene chloride polymer composite. Vinylidene chloride polymer may be applied as a water-based coating to other plastic films to increase the barrier properties by reducing the permeability of the films toward oxygen and flavour, and thus enabling to extend the shelf life of the contents inside the packaging prepared with the polyvinylidene chloride composite of the present invention.

The invention will be now described in more detail with reference to the following examples, whose purpose is merely illustrative and not intended to limit the scope of the invention. Should the disclosure of any patents, patent applications, and publications, which are incorporated herein by reference, conflict with the description of the present application to the extent that it may render a term unclear, the present description shall take precedence.

While preferred embodiments of the present invention have been shown and described, modifications thereof can be made by one skilled in the art without departing from the teaching of the present invention. The embodiments and examples described herein are exemplary only and are not limiting. Many variations and modifications of systems and methods are possible and are within the scope of the present invention. Accordingly, the scope of protection is not limited to the embodiments described herein, but is only limited by the claims that follow, the scope of which shall include all equivalents of the subject matter of the claims.

Further details and advantages of the invention will become apparent from the examples given below for illustrative purposes only.

EXAMPLES

The following reagents were used in the examples:
  APS: Ammonium persulfate (available from Acros Organic);
  Disponil® LDBS 25: solution at 258 g L$^{-1}$ of an anionic surfactant (available from BASF);
  Clays: Laponite® RDS; Laponite® S482; Laponite® XLG; and Cloisite® Na$^+$ (all available from BYK Additives);
  MA: Methyl acrylate (purity >99%; distilled under vacuum; available from Aldrich);
  Na$_4$P$_2$O$_7$: Sodium pyrophosphate (purity 98%; available from Aldrich);
  VDC: Vinylidene chloride (purity 99.5% (GC); washed with 25 wt % of NaOH solution; available from Fluka); and
  Water: Deionized with a PureLab system.

Characterization

Monomer to polymer conversion was determined by gravimetric analysis.

Average particle diameter (D$_Z$) and polydispersity (PdI) of the diluted aqueous polymer dispersion were measured by dynamic light scattering (DLS) at 25° C., using the Zetasizer Nano S90 from Malvern Instruments (173° angle, 5 mW He—Ne laser at 633 nm). The number of particles (N$_P$) was calculated from D$_Z$.

The coagulum refers to the insoluble solid which is formed during the polymerisation and it is weighted at the end of the experiment. The percentage of coagulum is calculated considering the relative amount of the clay materials and the monomers initially introduced into the reactor.

The percentage of surface coverage of the latex particles by the clay platelets was determined using equation 1. N$_L$ corresponds to the number of Laponite platelets and S$_L$ is the area occupied by Laponite (assuming a 2D square lateral packing of the Laponite disks). N$_P$ is the number of polymer particles and S$_P$ is the surface area of one polymer particle.

$$\text{Coverage (\%)} = \frac{N_L \times S_L}{N_P \times S_P} \quad (1)$$

Examples 1-3

Synthesis of P(VDC-co-MA)/Laponite Composite Latexes Via Emulsion Polymerisation with 40 g L$^{-1}$ of Clay (10 wt % Clay Fraction Based on Monomers)

In Example 1, 0.16 g (0.7 mmol) of APS and 3.2 g of Laponite S482 were added to 80.3 g of water. This mixture was stirred until complete dissolution of the initiator and complete exfoliation of the clay (minimum 3 hours). Solids content was fixed at around 31% and the wt % of monomers (VDC/MA) at 90/10. The mixture was then introduced in the reactor and purged with nitrogen for 20 minutes. At the same time, VDC and MA were purged separately with nitrogen for 20 minutes at 0° C. and the bath was pre-heated at 70° C. without the connection to the reactor. After 20 minutes, 3.2 g (0.037 mol) of MA and 28.8 g (0.297 mol) of VDC were introduced via the injection valve into the reactor and the autoclave was pressurized at 1 bar with nitrogen. The reaction mixture was stirred with an anchor at 300 rpm and heated at 70° C.

At the end of the polymerisation, the latex was analyzed by gravimetric analysis and by DLS for conversion and particle size determination, respectively.

Example 2 was carried out following the same procedure as Example 1, but replacing Laponite S482 by Laponite RDS. Example 3 was carried out following the same procedure as Example 1, but replacing Laponite S482 by Laponite XLG and adding 0.32 g (1.2 mmol) of Na$_4$P$_2$O$_7$ with the clay. Laponite S482 is a permanent sol grade clay, whereas Laponite RDS is a temporary sol grade clay and Laponite XLG is a gel grade clay.

The operating conditions as well as the characteristics of the resulting latexes are summarized in Table 1.

TABLE 1

Influence of the nature of the clay used for the VDC/MA emulsion polymerisation

|  | Ex. 1 | Ex. 2 | Ex. 3 |
|---|---|---|---|
| [APS] (mmol L$_{aq}$$^{-1}$) | 9 | 9 | 9 |
| [Laponite S482] (g L$_{aq}$$^{-1}$) | 40 | — | — |
| (wt % based on monomers) | (10) | — | — |
| [Laponite RDS] (g L$_{aq}$$^{-1}$) | — | 40 | — |
| (wt % based on monomers) | — | (10) | — |
| [Laponite XLG] (g L$_{aq}$$^{-1}$) | — | — | 40 |
| (wt % based on monomers) | — | — | (10) |
| [Na$_4$P$_2$O$_7$] (mmol L$_{aq}$$^{-1}$) | — | — | 15 |
| (wt % based on clay) | — | — | (10) |
| Solids content (%) | 30.5 | 30.5 | 30.9 |
| VDC/MA (wt %/wt %) | 90/10 | 90/10 | 90/10 |
| Conversion (%) | 100 | 100 | 100 |
| D$_Z$ (nm, DLS) | 164 | 205 | 190 |
| PdI (DLS) | 0.09 | 0.15 | 0.12 |
| Coagulum (wt %) | 5.5 | 8 | 6 |
| Coverage (%) | 223 | 286 | 255 |

As shown in Table 1, the stability of the latex was governed by the type of clay, and the best result was obtained using the permanent sol grade clay, i.e., Laponite S482.

Examples 4-7

Synthesis of P(VDC-co-MA)/Laponite S482 Composite Latexes Through Emulsion Polymerisation for Different Wt % of VDC/MA at about 30% of Solids Content Examples 4 to 7 were carried out following the procedure used in Example 1, but varying the monomer composition: VDC/MA=83/17 (wt %/wt %) in Example 4, VDC/MA=85/15 (wt %/wt %) in Example 5, VDC/MA=87/13 (wt %/wt %) in Example 6 and VDC/MA=93/7 (wt %/wt %) in Example 7.

The operating conditions as well as the characteristics of the resulting latexes are summarized in Table 2.

TABLE 2

Influence of the monomer composition on the VDC/MA emulsion polymerization carried out in the presence of Laponite S482 (10 wt % based on monomers)

|  | Ex. 4 | Ex. 5 | Ex. 6 | Ex. 7 |
|---|---|---|---|---|
| [APS] (mmol $L_{aq}^{-1}$) | 9 | 9 | 9 | 9 |
| [Laponite S482] (g $L_{aq}^{-1}$) | 40 | 40 | 40 | 40 |
| (wt % based on monomers) | (10) | (10) | (10) | (10) |
| VDC/MA (wt %/wt %) | 83/17 | 85/15 | 87/13 | 93/7 |
| Conversion (%) | 100 | 100 | 100 | 96 |
| $D_Z$ (nm, DLS) | 264 | 175 | 165 | 163 |
| PdI (DLS) | 0.35 | 0.09 | 0.09 | 0.04 |
| Coagulum (wt %) | 10 | 2 | 2 | 10 |
| Coverage (%) | 359 | 231 | 225 | 233 |

Example 4 led to bigger particles ($D_Z$) and higher PdI in comparison with other examples (Ex. 5-7), which showed similar characteristics ($D_Z$, PdI and Coverage). Nonetheless, the percentage of coagulum was prominent for Example 4 and Example 7.

As being confirmed from the experimental data in Table 2, there exists an optimal range of wt % of VDC/MA in the copolymer in terms of $D_Z$ and PdI.

Examples 8C-13

Synthesis of P(VDC-co-MA)/Laponite S482 Composite Latexes Via Emulsion Polymerisation at Around 30% Solids Content with Various Clay Contents A series of experiments were implemented to comprehend the impact of clay concentration on the average particle diameter of the resulting latex and its colloidal stability. Solids content was fixed at around 30% and the wt % of monomers (VDC/MA) at 87/13 (i.e. 4.2 g (0.048 mol) of MA and 27.8 g (0.287 mol) of VDC were introduced). Examples 8C-13 were carried out following the same procedure as Example 1, but the amount of Laponite S482 was adjusted to 4.0, 12.5, 20.0, 30.0, 40.0, and 60.0 g $L^{-1}$ with respect to the liquid phase. At the end of the polymerisation, the latex was analyzed by gravimetric analysis and by DLS for conversion and particle size determination, respectively.

The operating conditions as well as the characteristics of the resulting composites latexes are summarized in Table 3. Ex. 12 corresponds to Ex. 6 above.

TABLE 3

Influence of the clay content on the VDC/MA (87 wt %/13 wt %) emulsion polymerisation

|  | Ex. 8C | Ex. 9 | Ex. 10 | Ex. 11 | Ex. 12 | Ex. 13 |
|---|---|---|---|---|---|---|
| [Laponite S482] g $L_{aq}^{-1}$ | 4.0 | 12.5 | 20.0 | 30.0 | 40.0 | 60.0 |
| (wt % based on monomers) | (1.0) | (3.2) | (5.0) | (7.5) | (10.0) | (15.0) |
| Solids content (%) | 9.4 | 24.8 | 28.8 | 30.2 | 30.7 | 31.6 |
| VDC/MA (wt %/wt %) | 87/13 | 87/13 | 87/13 | 87/13 | 87/13 | 87/13 |
| Conversion (%) | 31 | 85 | 98 | 100 | 100 | 100 |
| $D_Z$ (nm, DLS) | 422 | 244 | 224 | 166 | 165 | 167 |
| PdI (DLS) | 0.13 | 0.23 | 0.15 | 0.13 | 0.09 | 0.14 |
| Coverage (%) | 199 | 124 | 130 | 126 | 225 | 342 |
| $N_p$ ($L_{emulsion}^{-1}$) | $1.9*10^{15}$ | $2.7*10^{16}$ | $4.2*10^{16}$ | $1.1*10^{17}$ | $1.1*10^{17}$ | $1.1*10^{17}$ |

At low concentration (4.0 g $L^{-1}$, Ex. 8), the number of clay platelets was not sufficient to provide enough stability to the particles and the latex flocculated quickly.

Figure 1:
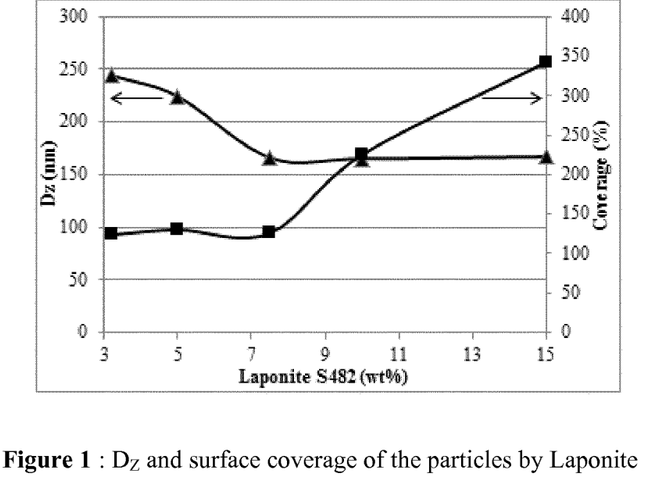
FIG. 1 and FIG. 2 are the graphs showing the direction of changes in view of $D_Z$ (nm), Coverage (%), and $N_P$ ($L_{emulsion}^{-1}$), when clay contents vary (from 4.0 to 60.0 g $L_{aq}^{-1}$ i.e., from 3.0 to 15.0 wt %).
Figure 2:
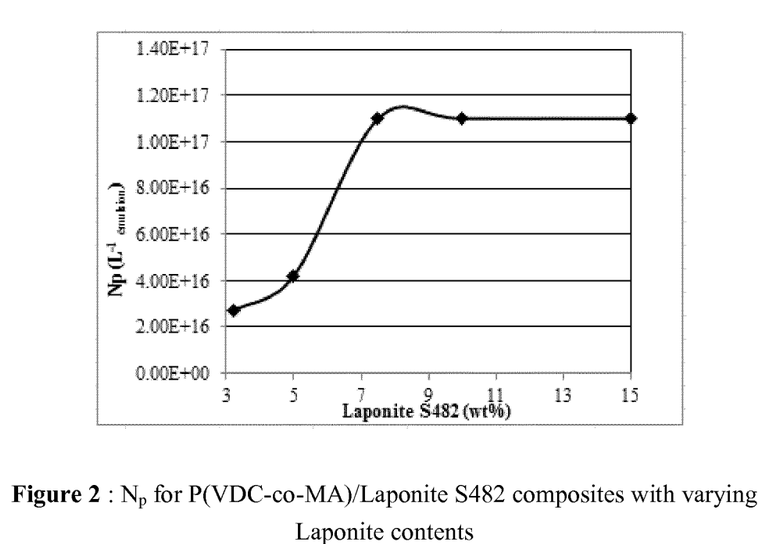

Increasing the amount of Laponite S482 to 12.5 g $L^{-1}$ (Ex. 9), 20.0 g $L^{-1}$ (Ex. 10) and 30.0 g $L^{-1}$ (Ex. 11) resulted in the decrease of the average particle diameter, whereas the number of particles increased. Both $N_P$ and $D_Z$ remained constant between 30.0 g $L^{-1}$ and 60.0 g $L^{-1}$ of clay. At 60.0 g $L^{-1}$ (Ex. 13), however, a so-called "house-of-card" structure was observed due to the excess of the clay material and resulted in a gel effect in the latex. Nonetheless, the initial latex viscosity could still be recovered by shaking the latex. The experimental data are shown in FIG. 1 ($D_Z$ and coverage) and FIG. 2 (Np).

Figure 3:
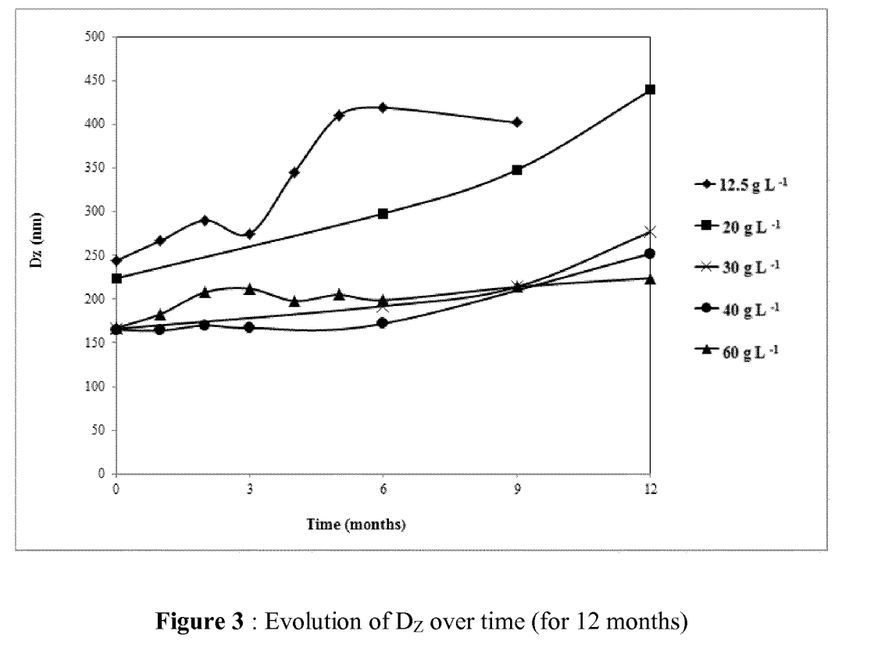
FIG. 3 demonstrates the evolution of $D_Z$ over time (for 12 months) in various clay contents (from 4.0 to 60.0 g $L_{aq}^{-1}$ i.e., from 1.0 to 15.0 wt %).

In addition, the experimental results showed that the surface coverage induced by the amount of the clay material had a strong influence on the particle size with time. As shown in FIG. 3, $D_Z$ remained relatively constant for concentration of clay comprising between 30.0 g $L^{-1}$ and 60.0 g $L^{-1}$ (Ex. 11, 12 and 13). For lower concentration (and lower surface coverage), $D_Z$ continued to increase over time (observed for 12 months) and the latex with a 12.5 g $L^{-1}$ concentration (Ex. 9) flocculated after 9 months.

Examples 14-16

Synthesis of P(VDC-co-MA)/Laponite S482 Composite Latexes Via Emulsion Polymerisation with Different Solids and Clay Contents In Ex. 14, 0.10 g (0.47 mmol) of APS and 1.0 g of Laponite S482 were added to 100.0 g of water. This mixture was stirred until complete dissolution of the initiator and complete exfoliation of the clay for at least 3 hours. The mixture was then introduced into the reactor and purged with nitrogen for 20 minutes. At the same time, VDC and MA were purged separately with nitrogen for 20 minutes at 0° C. and the bath was pre-heated at 70° C. without connection to the reactor. After 20 minutes, 2.0 g (0.023 mol) of MA and 18.0 g (0.186 mol) of VDC were introduced via the injection valve into the reactor and the autoclave was pressurized at 1 bar with nitrogen. The reaction mixture was stirred with an anchor at 300 rpm and heated at 70° C.

Ex. 15 was carried out following the procedure used in Ex. 14 except that 0.24 g (1.08 mmol) of APS and 2.4 g of Laponite S482 were added to 81.4 g of water and that 4.8 g (0.056 mol) of MA and 43.2 g (0.446 mol) of VDC were introduced via the injection valve into the reactor.

Ex. 16 was carried out following the procedure used in Example 15, but adding 4.8 g of Laponite S482.

At the end of the polymerisation, the latexes were analyzed by gravimetric analysis and by DLS for conversion and particle size determination, respectively.

The operating conditions as well as the characteristics of the resulting latexes are summarized in Table 4.

TABLE 4

Influence of the solids and clay contents on the VDC/MA emulsion polymerisation

|  | Ex. 14 | Ex. 15 | Ex. 16 |
|---|---|---|---|
| [APS] (mmol $L_{aq}^{-1}$) | 4.7 | 13 | 13 |
| [Laponite S482] (g $L_{aq}^{-1}$) | 10 | 30 | 60 |
| (wt % based on monomers) | (5) | (5) | (10) |
| Solids content (%) | 17.4 | 38.4 | 39.5 |
| VDC/MA (wt %/wt %) | 90/10 | 90/10 | 90/10 |
| Conversion (%) | 100 | 96 | 100 |
| $D_Z$ (nm, DLS) | 131 | 218 | 176 |
| PdI (DLS) | 0.04 | 0.12 | 0.11 |
| Coagulum (wt %) | 2 | 8 | 7 |
| Coverage (%) | 90 | 150 | 240 |

Examples 14-16 were carried out by decreasing the solids content to 17.4% in Ex. 14 and by increasing the solids content up to 38.4% and 39.5% respectively in Examples 15 and 16, in comparison with other Examples of which the solids content was set to be around 30%. As shown in Ex. 14, the surface coverage of the polymer particle by the clay platelets was under 100% (i.e., 90%) when decreasing the solids content down to 17.4%. In addition, as demonstrated in Ex. 15, increasing the solids content raised both $D_Z$ and the amount of coagulum. It was also observed even when the clay content was increased (Example 16) in comparison with Ex. 14.

Example 17

Synthesis of P(VDC-co-MA)/Laponite S482 Composite Latexes Via Emulsion Polymerisation Using a Surfactant Example 17 was carried out following the same procedure as Example 16, but adding 0.17 g of Disponil® LDBS25 solution as a surfactant in the aqueous phase.

The operating conditions as well as the characteristics of the resulting latexes are summarized in Table 5.

TABLE 5

Influence of the Disponil ® LDBS 25 on the VDC/MA emulsion polymerisation

|  | Ex. 17 |
|---|---|
| [APS] (mmol $L_{aq}^{-1}$) | 13 |
| [Laponite S482] (g $L_{aq}^{-1}$) | 60 |
| (wt % based on monomers) | 10 |
| VDC/MA (wt %/wt %) | 90/10 |
| Disponil ® LDBS 25 (g $L_{aq}^{-1}$) | 0.55 |
| (wt % based on monomers) | 0.10 |
| Conversion (%) | 100 |
| $D_Z$ (nm, DLS) | 306 |
| PdI (DLS) | 0.27 |
| Coagulum (wt %) | 6 |
| Coverage (%) | 420 |

Comparing to Ex. 16, $D_Z$ and PdI values of Ex. 17 were bigger. From the experimental data in Tables 4 and 5, it was believed that a competition between Laponite S482 and Disponil® LDBS25 occurred during the polymerisation and, surprisingly, incorporation of a surfactant resulted in a poor stability of the latex.

Complementary analyses also proved that the films prepared by using a vinylidene chloride polymer composite of the present invention having 87 wt %/13 wt % of VDC/MA with incorporation of clay materials in various amounts were optically transparent, notably retained their transparency even after sterilization (0.5 hour at 121° C.) or pasteurization treatment (2 hours at 95° C.) in comparison with the films prepared by using another vinylidene chloride polymer without incorporation of clay materials, of which the color changed from colorless to opaque white.

The invention claimed is:

1. A process for preparing a vinylidene chloride polymer composite, the process comprising:
   adding vinylidene chloride and at least one ethylenically unsaturated monomer copolymerisable therewith to a dispersion, said dispersion comprising a clay material and a free radical initiator in a liquid phase; and
   polymerising vinylidene chloride and said at least one ethylenically unsaturated monomer to form a vinylidene chloride polymer composite comprising a vinylidene chloride copolymer and the clay material,
   wherein the amount of clay material ranges from 10.0 to 60.0 g per liter ("g $L^{-1}$") with respect to the liquid phase and wherein the copolymer has a percent by weight (wt %) of vinylidene chloride/said ethylenically unsaturated monomer from 82/18 to 93/7,
   and wherein the liquid phase is water.

2. The process according to claim 1, wherein the clay material surrounds the particle surface of the vinylidene chloride copolymer.

3. The process according to claim 1, wherein the clay material is selected from the group consisting of montmorillonite, hectorite, laponite, saponite, mica, vermiculite, nontronite, beidellite, volkonskoite, kaolinite, serpentinite, and gibbsite.

4. The process according to claim 1, wherein the clay material is laponite.

5. The process according to claim 1, wherein the free radical initiator is selected from the group consisting of peroxides, hydroperoxides, azo compounds, redox compounds, and photoinitiators.

6. The process according to claim 1, wherein the free radical initiator is an inorganic initiator.

7. The process according to claim 1, wherein the amount of clay material ranges from 25.0 to 40.0 g $L^{-1}$ with respect to the liquid phase, and wherein the vinylidene chloride copolymer has a wt % of vinylidene chloride/said ethylenically unsaturated monomer from 85/15 to 90/10.

\* \* \* \* \*

UNITED STATES PATENT AND TRADEMARK OFFICE
CERTIFICATE OF CORRECTION

PATENT NO. : 10,982,110 B2
APPLICATION NO. : 15/778891
DATED : April 20, 2021
INVENTOR(S) : Pierre-Emmanuel Dufils et al.

It is certified that error appears in the above-identified patent and that said Letters Patent is hereby corrected as shown below:

On the Title Page

Page 2, Column 2 Item (56) References Cited, FOREIGN PATENT DOCUMENTS, the number "RU 230631" should read -- RU 2350631 --.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*